W. A. PERKINS.
AUTOMOBILE DIRECTION INDICATOR.
APPLICATION FILED JULY 7, 1920.
Patented Apr. 11, 1922.
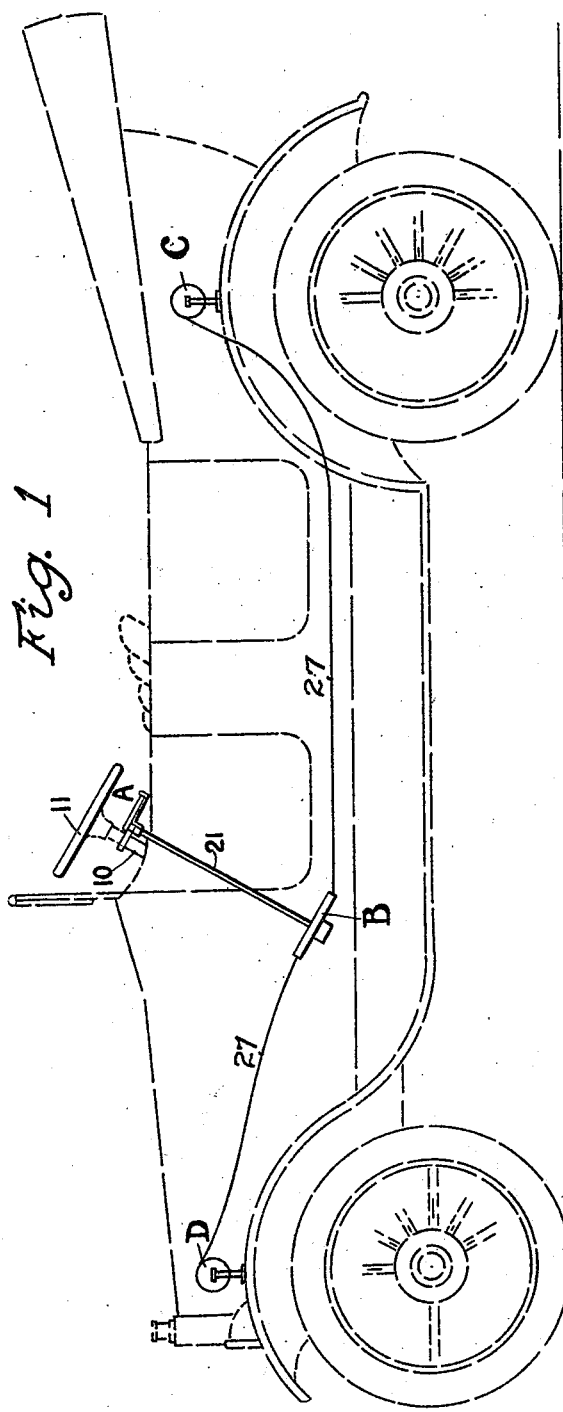
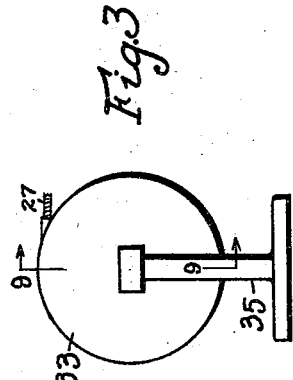
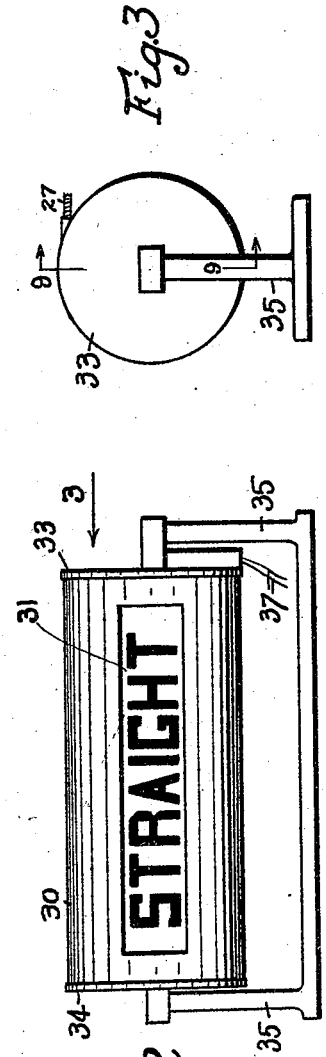

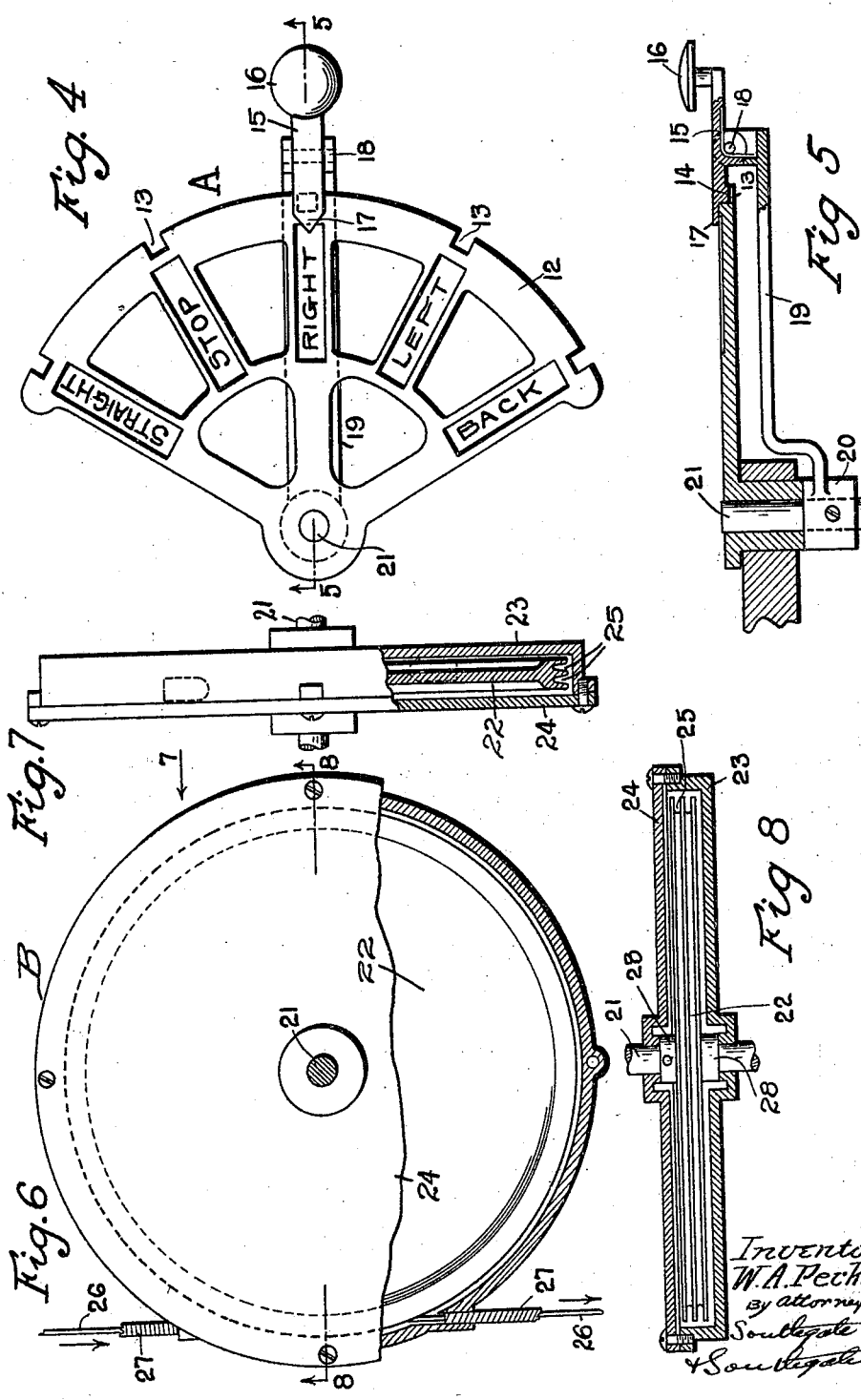

W. A. PERKINS.
AUTOMOBILE DIRECTION INDICATOR.
APPLICATION FILED JULY 7, 1920.
1,412,195. Patented Apr. 11, 1922.
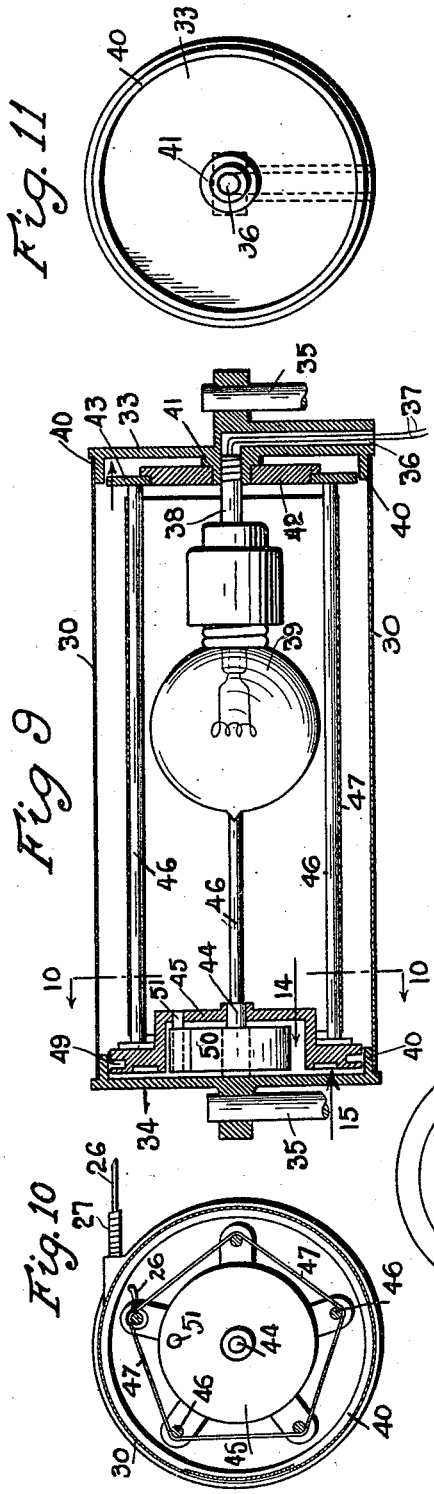
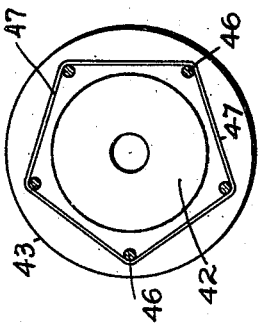
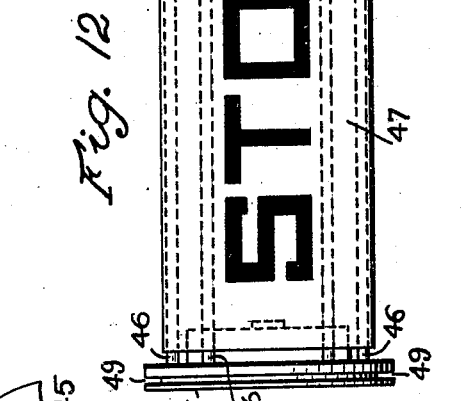
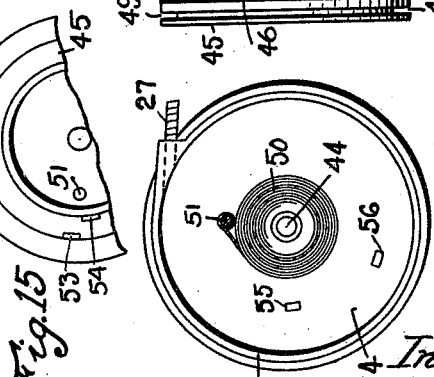

UNITED STATES PATENT OFFICE.

WILLIS A. PERKINS, OF WORCESTER, MASSACHUSETTS.

AUTOMOBILE DIRECTION INDICATOR.

1,412,195.    Specification of Letters Patent.    Patented Apr. 11, 1922.

Application filed July 7, 1920. Serial No. 394,496.

*To all whom it may concern:*

Be it known that I, WILLIS A. PERKINS, a citizen of the United States, residing at Worcester, in the county of Worcester and State of Massachusetts, have invented a new and useful Automobile Direction Indicator, of which the following is a specification.

This invention relates to a device for application to an automobile or other vehicle for signalling or indicating its course.

The principal objects of the invention are to provide a simple and improved device which can be operated conveniently from a point near the steering wheel; which can be so arranged as to be illuminated at night, which can be applied at the front and rear of the car, the two parts of the device so located being operated simultaneously from one source of control, and especially to do away with all gearing and other complicated and expensive operating connections. The invention also involves various features of construction and combinations of parts as will appear.

Reference is to be had to the accompanying drawings in which—

Fig. 1 is a side view of an automobile showing how this invention can be applied thereto at the front and rear;

Fig. 2 is an elevation of one of the installations;

Fig. 3 is an end view of the same;

Fig. 4 is a plan of the controlling device attached preferably under the steering wheel;

Fig. 5 is a sectional view of the same on the line 5—5 of Fig. 4;

Fig. 6 is a plan partly in section of the mechanism operated by said controlling device for actuating the two indicating devices;

Fig. 7 is an edge view of the same partly in section;

Fig. 8 is a sectional view of the casing on the line 8—8 of Fig. 6;

Fig. 9 is a longitudinal central sectional view of one of the indicating devices on the line 9—9 of Fig. 3;

Fig. 10 is a sectional view of the same on the line 10—10 of Fig. 9;

Fig. 11 is an inside elevation of the end piece which supports the illuminating device;

Fig. 12 is a view of the interior of the device with the outer casing removed;

Fig. 13 is a sectional view on the line 13—13 of Fig. 12;

Fig. 14 is an inside view of the end piece supporting the spring for actuating the indicator, and Fig. 15 is an end view of the oscillator disc at the same end.

The invention is shown as involving a controller A mounted on the steering column, a transmitting element B and two indicators C and D respectively. In general, it may be said that the controller A is operated by hand by the operator of the car. It is located in convenient position with respect to the steering wheel for that purpose. It turns the transmitting device B which always, no matter how turned, operates both the indicators C and D so as to show from the front of the indicator D and at the rear from the indicator C the course which the car is going to take.

More in detail, the controller A comprises a stationary sector 12 mounted on the steering column 10 under the steering wheel 11 and provided with words or characters, radially arranged and, indicating the actions which the car may be caused to take. This sector 12 is provided with notches 13 for receiving a projection 14 on a lever 15. This lever has a press button 16 for operating it and a pointer 17 for indicating the proper word on the sector. This lever is pivoted on a stud 18 mounted on an oscillatable arm 19 connected with a collar 20 which is fixed to a shaft 21 parallel with the steering column 10.

It will be obvious that the operator can lift the projection 14 out of its notch by pressing on the button 16 and swinging the arm 19 around into any desired position to show the course he intends the car to take. This turns the shaft 21 correspondingly.

The shaft 21 has fixed to it at the bottom a transmitting wheel 22. This is located in a casing 23 having a cover 24 removably secured thereon, and the shaft is provided with collars 28 fitting accurately in the casing so as to avoid lost motion. This wheel 22 is provided with grooves 25 for receiving a wire 26 or other flexible connection.

The turning of the shaft 21 winds up this wire on one side of the wheel and lets it out at the other. This wire is encased in a flexible coil 27 on both sides and they extend to the two indicators C and D.

Each of these indicators comprises a stationary shell 30 of metal or other opaque material, but having an opening provided with a transparent pane 31 of celluloid, glass, or the like, located in the front of the indicator D and in the rear of the indicator C. This is to expose the signal to be given. The casing 30 is supported on two stationary end pieces 33 and 34 which are fixed on uprights 35 preferably mounted on the front and rear mud-guards and on the left side of the machine. The end plate 33 is provided with a passage 36 for wires 37 which pass into the plate and through a central tube 38 therein to an electric lamp 39 or a series of them as may be desired. These parts are obviously supported in stationary position. This plate 33 as well as the other end plate 34 is provided with a flange 40 to which the casing 30 is riveted or otherwise secured.

Mounted on a bearing 41 on the center of the plate 33 is a rotary disc 42 which carries an annular disc 43 that rotates with it. At the other end the end piece 34 carries a central shaft or stud 44 on which is centered and rotatably mounted a disc 45. These two members 43 and 45 carry a series of longitudinal rods 46 and constitute with them an oscillatable frame-work. These rods carry upon them a sheet 47 of material on which appear the several words, designs or characters needed to indicate the proposed action of the car, as for example, the words "Straight," "Stop," "Right," "Left," and "Back," the same words that are shown and used on the controller A. The material of which the sheet 47 is made is preferably translucent, so that the words appearing in opaque characters will show up clearly in the night. These characters can be of different color from the sheet so as to show up well in the day time. I prefer also to provide a red background on the sheet 47 behind the word "Stop" for example, to indicate danger. This sheet 47 can be made of cloth, celluloid, or other material, and it may be either flexible or rigid.

This indicator therefore is to be operated from the wire 26 which comes into the casing as above described and enters a groove 49 on the disc 45, and is partly wound up thereon, its end being secured thereto. On the stationary stud 44 is an operating spring 50, one end being secured to this stud. The other end is secured to a stud 51 mounted on the rotating disc 45. The parts are so set originally that when the whole indicator is turned over to the last point the spring 50 will be wound up and it will act to turn it back automatically whenever the wire 26 is allowed to move in that direction. The motion of the indicator is limited by two stops 53 and 54 on the disc 45 and two stops 55 and 56 on the end piece 34. The indicator is allowed to turn substantially all the way around, but not to start on a second rotation in either direction.

It will be understood that the two indicators C and D are alike except that in a sense they are rights and lefts. When the parts are in the position shown in Fig. 4 with the controller indicating that the car is to go to the right, both of the indicators are partly unwound and both of them indicate the word "Right." Now the controller arm is turned around to the point indicating "Straight" for example, which is at the extreme right hand end of the controller. The wire 26 passing to one of the indicators is wound up and that causes that indicator to turn to expose the word "Straight," but the wire to the other indicator is at the same time being unwound and allowed to move back in the other direction. That also exposes the word "Straight." In other words, the order of the words on the two indicators is reversed but they both always of course indicate the same thing. The operation of the device has been described in the course of the description of the parts and need not be specified again.

Although I have illustrated and described only a single form of the invention I am aware of the fact that many modifications can be made therein by any person skilled in the art without departing from the scope of the invention as expressed in the claims.

Therefore I do not wish to be limited to all the details of construction herein shown and described, but what I do claim is:—

1. In a device of the character described, the combination with a vehicle, of two stationary casings located at the front and rear, over each wheel, a rotary member inside each casing provided with indicating characters arranged in series on each one but in opposite relation to each other, two flexible connections, each connected to actuate one of said rotary members, and means for moving both of said flexible connections in the same direction for simultaneously moving the two rotary members in opposite directions.

2. In a device of the character described, the combination of the steering column and mud-guard of an automobile, with a sector located on the steering column and having indicating characters spaced apart around it, a movable member adapted to register with any one of said indicating characters, a direction indicator located on the mud-guard having an oscillating motion, and means for transmitting the motion of said movable member to the direction indicators to turn them in opposite directions.

3. In an indicator, the combination of a pair of end pieces located in fixed position, a casing supported by them and located between them, one of said end pieces having means for supporting an electric lamp and for locating the conducting wires and a central hub, a disc rotatably supported on said hub, the other end piece having a stationary shaft, a disc rotatably mounted on said shaft, the latter disc having a recess therein, a coiled spring in said recess having one end fixed to the shaft and the other to that disc, means for oscillating the latter named disc, a series of rods extending between said discs at equal distances from the center and constituting with said discs an oscillatable frame, a flexible covering passing around said rods and having a plurality of flat sides on which direction signals are located, said casing having an opening for exposing one of said direction signals at a time.

In testimony whereof I have hereunto affixed my signature.

WILLIS A. PERKINS.